United States Patent
Sakakura

(10) Patent No.: US 7,103,023 B2
(45) Date of Patent: Sep. 5, 2006

(54) RADIO COMMUNICATION CONTROL STATION, RADIO COMMUNICATION TERMINAL, HOME AGENT, AND RADIO COMMUNICATION METHOD

(75) Inventor: Takashi Sakakura, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 1025 days.

(21) Appl. No.: 09/971,573

(22) Filed: Oct. 9, 2001

(65) Prior Publication Data

US 2002/0064141 A1   May 30, 2002

(30) Foreign Application Priority Data

Nov. 24, 2000  (JP) .............................. 2000-358373

(51) Int. Cl.
*H04Q 7/00* (2006.01)
(52) U.S. Cl. ...................... 370/331; 370/328; 370/329; 370/338
(58) Field of Classification Search ................ 370/328, 370/329, 331, 338
See application file for complete search history.

(56) References Cited

U.S. PATENT DOCUMENTS 6,163,843 A * 12/2000 Inoue et al. ................... 726/11
6,512,754 B1 * 1/2003 Feder et al. ................. 370/338
6,708,030 B1 * 3/2004 Horikawa .................... 455/436
6,775,255 B1 * 8/2004 Roy ........................... 370/331
6,842,456 B1 * 1/2005 Chen et al. .................. 370/401

FOREIGN PATENT DOCUMENTS

JP      A2000-253069      9/2000

* cited by examiner

*Primary Examiner*—Ricky Q. Ngo
*Assistant Examiner*—Jonathan Liou
(74) *Attorney, Agent, or Firm*—Birch, Stewart, Kolasch & Birch, LLP

(57) ABSTRACT

A radio communication control station including a packet receiver, a paging controller, a location information receiver, and a retriever. The packet receiver receives an IP packet destined for a radio communication terminal subscribing to one of sub-networks constituting a composite radio communication network. The paging controller causes one of the sub-networks to page the radio communication terminal. The location information receiver receives location information on a current location of the radio communication terminal from the radio communication terminal. The retriever retrieves candidates of sub-networks that can be employed by the radio communication terminal on the basis of the location information on the radio communication terminal. The radio communication terminal selects a sub-network for its use among from the candidates and establishes an environment for communication with the sub-network.

15 Claims, 7 Drawing Sheets

| 301 | 302 | 303 | 305 | 304 |
|---|---|---|---|---|
| BASE STATION NAME | LONGITUDE | | LATITUDE | STATUS |
| NetA.bs1 | 139.10.10.0 | 139.13.55.0 | 35.20.20.0 35.22.50.0 | AVAILABLE |
| NetB.bs1 | 139.10.10.1 | 139.10.12.3 | 35.20.20.1 35.20.21.6 | AVAILABLE |
| ⋮ | | | 306 | |

RADIO COMMUNICATION CONTROL STATION, RADIO COMMUNICATION TERMINAL, HOME AGENT, AND RADIO COMMUNICATION METHOD

BACKGROUND OF THE INVENTION

1. Field of the Invention

The present invention relates to a radio communication control station, a radio communication terminal, a home agent, and a radio communication method for implementing IP communication in a composite radio communication network comprising a plurality of radio communication networks.

2. Prior Art

On account of the development of radio communication networks including mobile phone networks and the universalization of the Internet, the demand of Internet communication by means of radio communication terminals is rising. Such a demand has been satisfied, e.g., by i-mode (Trademark of NTT DoCoMo Inc. Tokyo, Japan) and the rapid popularization of i-mode is remarkable in this country.

In accordance with the i-mode technique, however, terminals are not given Internet protocol (IP) addresses, which are terminal identifiers for the Internet. Accordingly, a node on the Internet-side cannot carry out self-initiated transmission to the mobile phone terminals over IP although the mobile phone terminals can access to the Internet via the gateway interconnecting the mobile phone network and the Internet, using the hyper text transfer protocol (HTTP) or the like.

If a computer terminal plugged with a mobile telephone handset by a modem accesses to the Internet via the mobile telephone network, the terminal is temporarily allocated an IP address by an Internet access provider. In this case, a node on the Internet-side can carry out self-initiated transmission to the terminal over IP if the node knows the temporary IP address somehow. However, even in this case, the terminal is not permanently allocated an IP address.

The Internet has been designed and constructed with geographically fixed sub-networks and terminals, and packet routing has been operated on the IP address which represents the fixed sub-network where the terminal belongs. Therefore, even if a terminal is given an IP address, it cannot communicate with another party via another sub-network when the IP address is different from and is not void in the address system of the other party's sub-network.

The Mobile Internet Protocol (mobile IP) is known as a technique for solving the above-described issue on IP address. In accordance with mobile IP, an inherent or permanent IP address is allocated to a mobile terminal as well as fixed terminals. When the mobile terminal is linked with a sub-network different from its home sub-network, where the mobile terminal originally subscribes, the mobile terminal is assigned another IP address for the newly visited sub-network. Accordingly, the mobile terminal not only has the original or inherent IP address, but also the temporary IP address that is effective in the visited sub-network. Since the relationship between the inherent IP address and the new IP address is registered in the home sub-network, IP packets destined for the inherent IP address are transferred to the assigned IP address that is effective in the latest stage, whereby the destination terminal can receive the IP packets successfully.

The home sub-network where a mobile terminal subscribes is referred to as a home network for the mobile terminal. The home network includes a mechanism called home agent (HA) that monitors the relationship between the inherent IP address and the newest IP address for every mobile terminal subscribing to the home network itself, and transfers IP packets using the newest IP addresses.

JP-A-2000-253069 discloses a technique for ensuring quality of service although mobile IP is utilized. In accordance with mobile IP, IP packets are encapsulated so as to be transferred to the sub-network visited by the destination terminal. At this encapsulation, the inherent IP packets are modified to be adapted for the sub-network, which the destination mobile terminal currently visits. The technique of JP-A-2000-253069 keeps the attributes of the quality of service indicated in the inherent IP packets effective at the modification. The use of mobile IP has a merit that IP packets may be successfully transferred on the basis of the newest IP addresses corresponding to inherent IP addresses. However, problems has been indicated. For example, the cost and latency are increased for transferring packets from the HA to the destination terminal.

On the other hand, demands for high rate transmission using radio communication terminals and flexible mobility support for mobile terminals have been increased. Therefore, the studies on stratosphere platform, MMAC (multiple model adaptive control), and so on have been progressed.

Generally, when a high frequency band is used for implementing high rate communication, the electromagnetic attenuation and other problems occur due to the severe directivity and much diffusion and absorption at reflections, resulting great difficulty in mobility support although the data propagation rate can be enhanced. Accordingly, it is difficult to satisfy requirements of all radio communication terminals by a sole network. Thus, a radio overlay network (composite radio communication network) including a plurality of radio networks has been studied. In the radio overlay network, one or more constituent networks are selectively used in accordance with requirements of a user or application.

However, in conventional composite radio communication networks, it is impossible for radio communication terminals such as mobile phone handsets to implement IP communication.

SUMMARY OF THE INVENTION

It is therefore an object of the present invention to provide a radio communication control station, a radio communication terminal, a home agent, and a radio communication method for facilitating IP communication of radio communication terminals such as mobile phone handsets in a composite radio communication network.

In accordance with an aspect of the present invention, there is provided a radio communication control station comprising: a packet receiver for receiving an IP packet destined for a radio communication terminal subscribing to one of sub-networks constituting a composite radio communication network; a paging controller for causing one of the sub-networks to page the radio communication terminal; a location information receiver for receiving location information on a current location of the radio communication terminal from the radio communication terminal; and a retriever for retrieving candidates of sub-networks that can be employed by the radio communication terminal on the basis of the location information on the radio communication terminal.

With such a structure, it is possible that radio communication terminals such as mobile phone handsets can execute IP communication in a composite radio communication network.

The paging controller may cause a sub-network having a maximum service area among the sub-networks to page the radio communication terminal. In this case, it is possible to page the subject terminal efficiently.

The paging controller may transmit information on the candidates of sub-networks, which can be employed by the radio communication terminal, to the radio communication terminal. In this case, the radio communication terminal itself can select an optimum sub-network that is the most suitable for the terminal's status.

The radio communication control station may further comprise a packet transmitter for modifying the IP packet, which has been already received by the packet receiver, to be matched with the selected sub-network when a connection environment is established between the sub-network selected by the radio communication terminal for its use and the radio communication terminal. The packet transmitter may transmit the modified IP packet to the radio communication terminal. With such a structure, the IP packet, which has been already received by the packet receiver, can be delivered to the destination terminal without being discarded even after the connection environment is established between the selected sub-network and the radio communication terminal.

The radio communication control station may further comprise an authenticator for verifying authentication information of the radio communication terminal received from the radio communication terminal. In this case, an unauthorized radio communication terminal is prevented from being linked with the composite radio communication network.

The radio communication control station may further comprise a transmitter for transmitting information to a home network to which the radio communication terminal originally subscribes. The authenticator may execute an authentication for the radio communication when the radio communication control station detects that communication between the sub-network and the radio communication terminal has ceased after a connection environment has been established between the sub-network selected by the radio communication terminal for its use and the radio communication terminal. The transmitter may inform the home network of a transfer-destination address of the radio communication terminal assigned before the communication has ceased when the radio communication control station detects that the communication has ceased. In this case, it is possible to readily restart IP communication with the radio communication terminal although the communication with the terminal has ceased.

The radio communication control station may further comprise a location information database storing location information on all base stations belonging to the composite radio communication network, the retriever retrieving from the location information database the candidates of sub-networks that can be employed by the radio communication terminal on the basis of the location information on the radio communication terminal. In this case, it is possible to readily retrieve the candidates of sub-networks available for the radio communication terminal.

The radio communication control station may further comprise a storage at which the location information received from the radio communication terminal is registered as a latest location information of the radio communication terminal. The paging controller may select at least one base station, which is suitable for the latest location information of the radio communication terminal registered at the storage, from among the sub-network used for paging and may cause the selected base station to page the radio communication terminal. In this case, it is possible to page the subject terminal efficiently.

The paging controller may transmit a message designating attributes of quality of service to the radio communication terminal when the attributes of quality of service are designated in the IP packet received by the packet receiver. In this case, the radio communication terminal may select an optimum sub-network that can realize appropriate quality of service.

The paging controller may transmit information on a sub-network that should be employed to the radio communication terminal when the IP packet received by the packet receiver is effectual only in the specific sub-network. With such a structure, it is possible to incorporate intrinsic services of existent networks, e.g., mobile phone networks, with the composite radio communication network.

The radio communication control station may further comprise an IP management module for allocating a temporary IP address to the radio communication terminal when the radio communication terminal selects a sub-network that does not comprises an IP address allocating mechanism for allocating IP addresses to terminals. In this case, although the selected sub-network that does not comprises an IP address allocating mechanism, IP communication can be facilitated.

In accordance with another aspect of the present invention, there is provided a radio communication terminal comprising: a location information transmitter for acquiring location information on a current location of the radio communication terminal and transmitting the location information to a radio communication control station when the radio communication terminal has been paged by the radio communication control station in one of sub-networks constituting a composite radio communication network; a selector for selecting a sub-network, which the radio communication terminal utilizes, from candidates of sub-networks available for the radio communication terminal once receiving information on the candidates of sub-networks; a setter for setting up a communication mechanism to be matched with the selected sub-network; and a negotiator for negotiating with the selected sub-network for establishing an environment of communication between the selected sub-network and the radio communication terminal.

With such a structure, it is possible that radio communication terminals can execute IP communication in a composite radio communication network.

The location information transmitter may acquire the location information of the radio communication terminal and may transmit the location information to the radio communication control station when change of sub-network used by the radio communication terminal becomes necessary. The selector may obtain information on candidates of sub-networks available for the radio communication terminal and may select a sub-network, which the radio communication terminal utilizes, from the candidates of sub-networks. The setter may reset up the communication mechanism to be matched with the selected sub-network. In this case, when it is necessary to change the sub-network used by the radio communication terminal, an optimum sub-network can be selected.

The location information transmitter may acquire the location information of the radio communication terminal and may transmit the location information to the radio communication control station when the radio communication terminal receives an IP packet requiring attributes of quality of service that are different from the attributes of quality of service currently used. The selector may obtain information on candidates of sub-networks available for the radio communication terminal and may select a sub-network, which the radio communication terminal utilizes, from the candidates of sub-networks. The setter may reset up the communication mechanism to be matched with the selected sub-network. In this case, when it is necessary to change attributes of quality of service, an optimum sub-network for realizing the attributes of quality of service can be selected.

The selector may separately select a sub-network for transmission by the terminal and a sub-network for reception by the terminal. The negotiator may negotiate with both of the selected sub-networks for establishing environments for communication between respective sub-networks and the terminal. In this case, it is possible to utilize different sub-networks for forward and rearward links having different communication properties.

In accordance with another aspect of the present invention, there is provided a home agent in a sub-network of a composite radio communication network for supervising, receiving, and transferring IP packets destined for radio communication terminals subscribing to the sub-network. The home agent comprises a transferrer that transfers an IP packet to a destination terminal using an IP address inherent in the destination terminal without transferring the IP packet to another sub-network when the destination terminal exists effectively in the sub-network where the home agent is provided and the inherent IP address can be used in the sub-network. The transferrer transfers an IP packet to a radio communication control station provided in the composite radio communication network when the destination terminal does not effectively exist in any sub-networks constituting the composite radio communication network. The transferrer uses a temporary IP address to transfer IP packets received after the destination terminal obtains the temporary IP address that is effective in a visited sub-network different from the network at which the home agent is provided.

With such a structure, IP communication by radio communication terminals such as mobile phone handsets can be facilitated in a composite radio communication network.

When communication between the visited sub-network and the radio to communication terminal has ceased after the destination terminal obtains the temporary IP address effective in the visited sub-network, the home agent may be notified of a temporary IP address of the radio communication terminal that was effective before the communication has ceased and may register the temporary IP address of the radio communication terminal at the home agent. In this case, it is possible to readily restart IP communication with the radio communication terminal although the communication with the terminal has ceased.

In accordance with still another aspect of the present invention, there is provided a radio communication method comprising: receiving an IP packet destined for a radio communication terminal subscribing to one of sub-networks constituting a composite radio communication network; causing one of the sub-networks to page the radio communication terminal; receiving location information on a current location of the radio communication terminal from the radio communication terminal; and retrieving candidates of sub-networks that can be employed by the radio communication terminal on the basis of the location information on the radio communication terminal.

With such a method, it is possible that radio communication terminals such as mobile phone handsets can execute IP communication in a composite radio communication network.

The radio communication method may further comprise transmitting information on the candidates of sub-networks, which can be employed by the radio communication terminal, to the radio communication terminal. In this case, the radio communication terminal itself can select an optimum sub-network that is the most suitable for the terminal's status.

The radio communication method may further comprise sending the radio communication terminal the IP packet, which has been received by the packet receiver, to be matched with the selected sub-network after an connection environment has been established between the sub-network selected by the radio communication terminal for its use and the radio communication terminal. In this case, the IP packet, which has been already received by the packet receiver, can be delivered to the destination terminal without being discarded even after the connection environment is established between the selected sub-network and the radio communication terminal.

BRIEF DESCRIPTION OF THE DRAWINGS

With reference to the accompanying drawings, various embodiments of the present invention will be described hereinafter. In the drawings.

DETAILED DESCRIPTION OF PREFERRED EMBODIMENTS

First Embodiment

Figure 1:
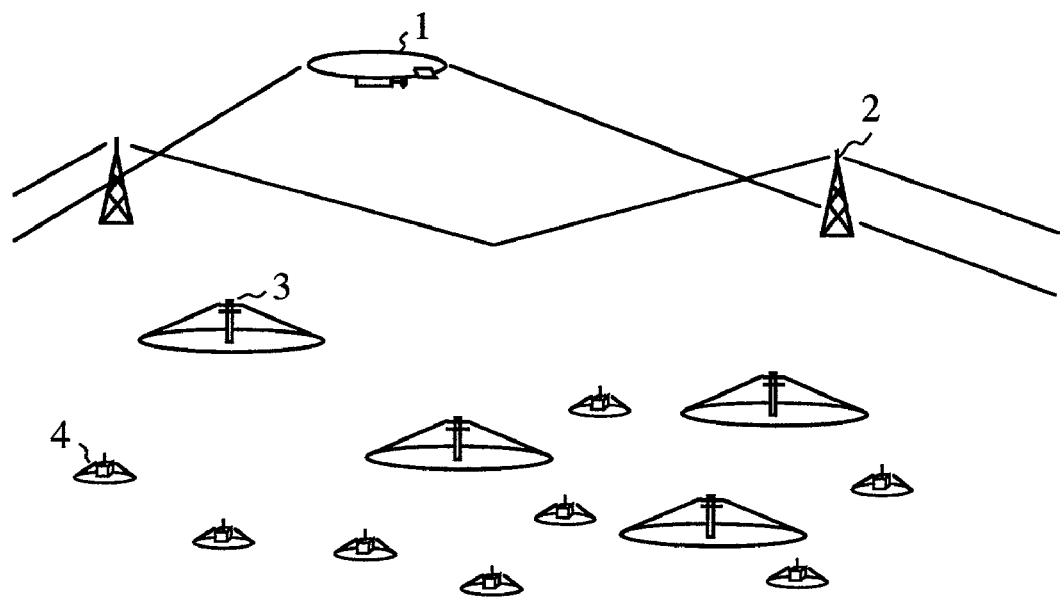
FIG. 1 is a conceptual diagram showing a radio overlay network to which applied is a radio communication system according to a first embodiment of the present invention.

FIG. 1 is a conceptual diagram showing a radio overlay network to which applied is a radio communication system according to a first embodiment of the present invention. The radio overlay network is constituted of a plurality of radio communication networks that have different characteristics, respectively, such as geographic service coverages, propagation rates, mobility support for terminals, and service charges.

Reference symbol 1 designates an access point of a stratosphere platform. The service area of the stratosphere platform network may be divided into a plurality of cells. An airship or access point 1 has a cell having a radius of about 50 km. The stratosphere platform network covers the entire service area of the radio overlay network according to the first embodiment. The stratosphere platform network uses millimeter wave for implementing high rate propagation, but the service charge is expensive and the power consumption at radio communication terminals is high.

2 denotes a base station of a bidirectional pager network. In the network using such pager base stations 2, the data propagation rate is low, but the network covers the entire service area of the radio overlay network. Since each pager base stations 2 covers a broad cell, problems will hardly occur when a mobile terminal travels.

3 denotes an access point of a personal handy-phone system (PHS). The service are of PHS is narrower than those of the stratosphere platform network and the pager network, but covers most urban areas of a plurality of cities. Each access point 3 covers a cell having a radius of 100 m to 1 km. In the PHS network, the data propagation rate is middle, the service charge is middle, and the mobility support for terminals is good.

4 denotes an access point of a high rate communication LAN (local area network). In the high rate communication LAN, the data propagation rate is high, the service charge is inexpensive, but the service area is restricted. Each access point 4 covers a cell having a radius of 10 m to 100 m.

In the illustrated radio overlay network, it is adequate that the bidirectional pager network is served as a paging network (signaling radio communication network) for paging a destination mobile terminal since it can cover the entire service area of the radio overlay network. Instead, the stratosphere platform network may be utilized as the paging network since it can also cover the entire service area of the radio overlay network.

While an example of radio overlay networks has been described with reference to FIG. 1, it is not intended to limit the present invention to the illustrated radio overlay network. Rather, different types of radio networks may be incorporated into an alternative embodiment of a radio overlay network of the present invention. In addition, the number and characteristics of sub-networks constituting the radio overlay network are not also intended to be limited.

Figure 2:
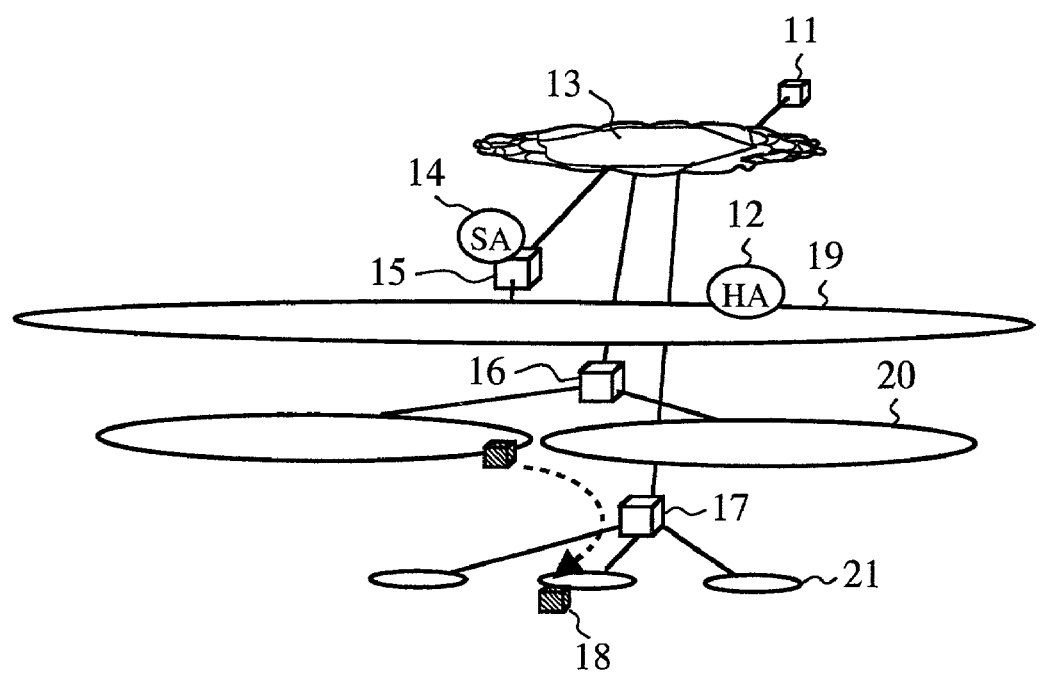
FIG. 2 is a conceptual diagram showing the radio communication system according to the first embodiment of the present invention.

FIG. 2 is a conceptual diagram showing a radio communication system according to the first embodiment of the present invention. In FIG. 2, reference symbols 19, 20, and 21 designate radio communication networks, respectively. The radio overlay network comprises the radio communication networks 19, 20, and 21. In other words, each of the radio communication networks 19, 20, and 21 is a constituent or sub-network of the radio overlay network (composite radio communication network).

The radio communication network 19 geographically covers the entire radio overlay network. The radio communication network 19 is a bidirectional pager network using the VHF band. The propagation rate in the radio communication network 19 is 9600 bps that is not high. The radio communication network 19 however can serve for traveling radio communication terminals, e.g., radio communication terminal 18). Upstream communication from a radio communication terminal to a base station is exclusively controlled by the slotted ALOHA. Each radio communication terminal served by the radio communication network 19 is identified by an individual identifier assigned by the network 19.

The radio communication network 20 almost covers the entire radio overlay network geographically. The radio communication network 20 is a mobile phone network using a band near 800 MHz. Each base station of the network 20 covers a cell of which the radius is about 2 through 3 km, and the propagation rate is about 64 kbps. The radio communication network 20 has the soft hand-off function that is effective even for IP communication. Each radio communication terminal served by the radio communication network 20 is also identified by an individual identifier assigned by the network 20.

The radio communication network 21 serves for particular places in the entire radio overlay network geographically. The radio communication network 21 uses the millimeter wave band. Each base station of the network 21 covers a cell of which the radius is about 30 m. The propagation rate is as much as 10 Mbps, but the radio communication network 21 does not have the soft hand-off function since the base stations are not necessarily arranged close to one another. The radio communication network 21 utilizes a communication media of the medium access control (MAC) type, so that an MAC address is assigned to each radio communication terminal served by the radio communication network 21.

13 designates the Internet. 15, 16, and 17 designate control stations (gateways) for the radio communication networks 19, 20, and 21, respectively. The radio communication networks 19, 20, and 21, which are sub-networks of the radio overlay network, are connected to the Internet 13 via the control stations 15, 16, and 17, respectively. However, it is not intended to limit the present invention to the disclosed embodiment wherein all of the sub-networks of the radio overlay network are connected with the Internet 13. In an alternative embodiment of the radio overlay network, some or all radio sub-networks are connected with a core network, instead of the Internet.

11 designates one of fixed communication terminals that can be linked with the Internet 13. 18 designates one of radio communication terminals served by the radio overlay network. The radio communication terminal 18 can roam among the sub-networks of the radio overlay network, but belongs to a subscriber of the radio communication network 19, so that it should be linked with the radio communication network 19 primarily. In other words, the radio communication network 19 is the home network for the radio communication terminal 18.

With regard to the following description, it will be assumed that the fixed terminal 11 and the radio communication terminal 18 that can roam will implement IP communication with each other. However, another embodiment wherein two radio communication terminals may implement IP communication is intended to be encompassed in the scope of the present invention.

12 denotes a home agent provided in the network 19, which is the home network for the radio communication terminal 18.

14 denotes a signaling agent (SA) for paging a destination terminal. In this embodiment, it is adequate that the bidirectional pager network 19 is selected to serve as the paging network (signaling radio communication network) since it has the broadest service area that can cover the entire service area of the radio overlay network. The radio communication control station 15 of the radio communication network 19 is provided with the SA 14.

At the HA 12 of the network 19, inherent IP addresses of mobile terminals subscribing to the network 19 are registered. The HA 12 receives from the Internet 13 IP packets destined for mobile terminals subscribing to the network 19 and transfers those to the mobile terminals.

However, when the radio communication terminals travel from the network 19 to another network 20 or 21, the radio communication terminals may be served by the network 20 or 21. When one of the radio communication terminals is leaving from the home network 19 (when it is going to be null for any of the sub-networks), it registers at the HA 12 the IP address of the SA 14 as the transfer-destination IP address of the radio communication terminal itself. Thus, when a destination radio communication terminal is null for any of the sub-networks, the HA 12 sends the SA 14 IP packets destined for the radio communication terminal.

Similar home agents are provided in the networks 20 and 21 and operate for radio communication terminals originally subscribing to the networks corresponding to the home agents although they are not illustrated.

The SA 14 refers to the permanent IP address of the destination radio communication terminal that is included in the IP packets transferred from the HA 12 and pages the destination radio communication terminal. The SA 14 has further functions, e.g., for referring to the location information of the destination radio communication terminal, for seeking candidates of sub-networks that the destination terminal can utilize among the radio communication network constituting the radio overlay network, and for informing the destination terminal of the candidates.

The radio communication terminal 18 has functions for acquiring the current location information thereof once it is paged, and for transmitting the location information to the SA 14. The terminal 18 has further functions for selecting the sub-network that the radio communication terminal 18 utilizes on the basis of the candidate information from the SA 14, for requesting establishment of connection environment of the selected sub-network, and notifying the SA 14 of the established connection environment.

Figure 3:
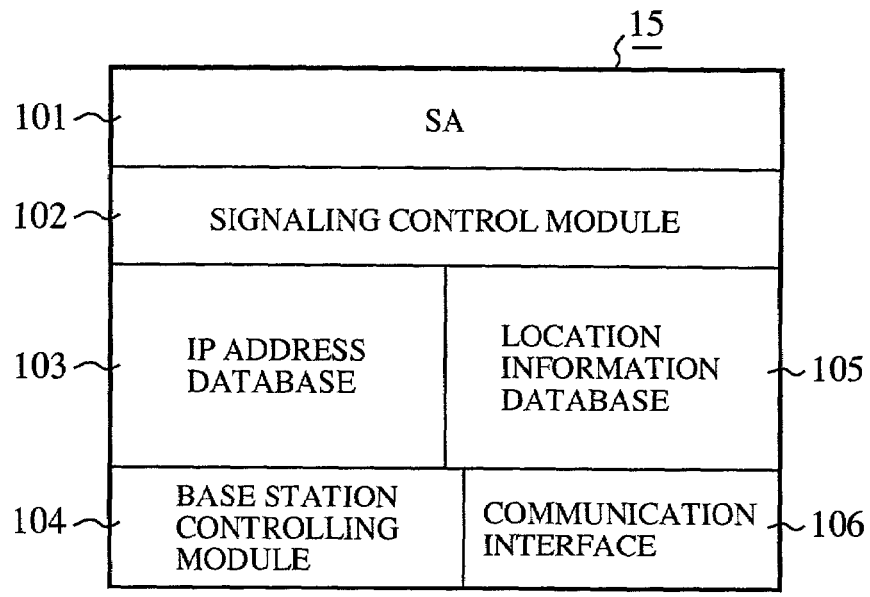
FIG. 3 is a conceptual diagram showing functional elements of a control station in the radio communication system.

FIG. 3 is a conceptual diagram showing functional elements of the control station 15 in the radio communication system. In FIG. 3, 101 designates the above-described SA (packet receiver, paging controller, retriever, packet transmitter, authenticator, and transmitter). Upon receiving IP packets transferred from the HA 12, the SA 101 controls signaling to destination terminals, e.g., the radio communication terminal 18, and retransfer the IP packets to the destination terminal 18.

102 denotes a signaling control module (paging controller and location information receiver) that communicates with the radio communication terminal 18 for, e.g., signaling. When the radio communication terminal 18 requests a radio communication network service, informing the control station 15 of the location of the terminal 18, the signaling control module 102 sends a response to the radio communication terminal 18.

103 designates an IP address database (storage) for storing transfer-destination IP addresses (temporary IP addresses) assigned to radio communication terminals by all sub-networks of the radio overlay network. When a radio communication terminal has roamed, an IP address effective in the sub-network where the terminal visits is given to the terminal. With reference to each radio communication terminal, the IP address database 103 stores the relationship among the newly assigned temporary IP address, the permanent IP address, and an identifier in the signaling network 19.

104 denotes a base station controlling module 104 for controlling base stations belonging to the sub-network 19 that should be controlled by the control station 15. When the SA 101 communicates with the radio communication terminal 18, one or more base stations selected by the base station controlling module 104 relays information.

105 designates a location information database where geographical information on all base stations and all cells of not only the sub-network 19, but also the sub-networks 20 and 21 forming the radio overlay network. When one of the base stations is out of order, congested, or removed, the radio communication network possessing the base station send the control station 15 a message indicating the status of the base station. According to the message, the location information database 105 is updated.

106 designates a communication interface designed to exchange information to and from the Internet 13. The communication interface 106 transforms information format in accordance with communication protocols generally used in the Internet, including IP.

Figure 4:
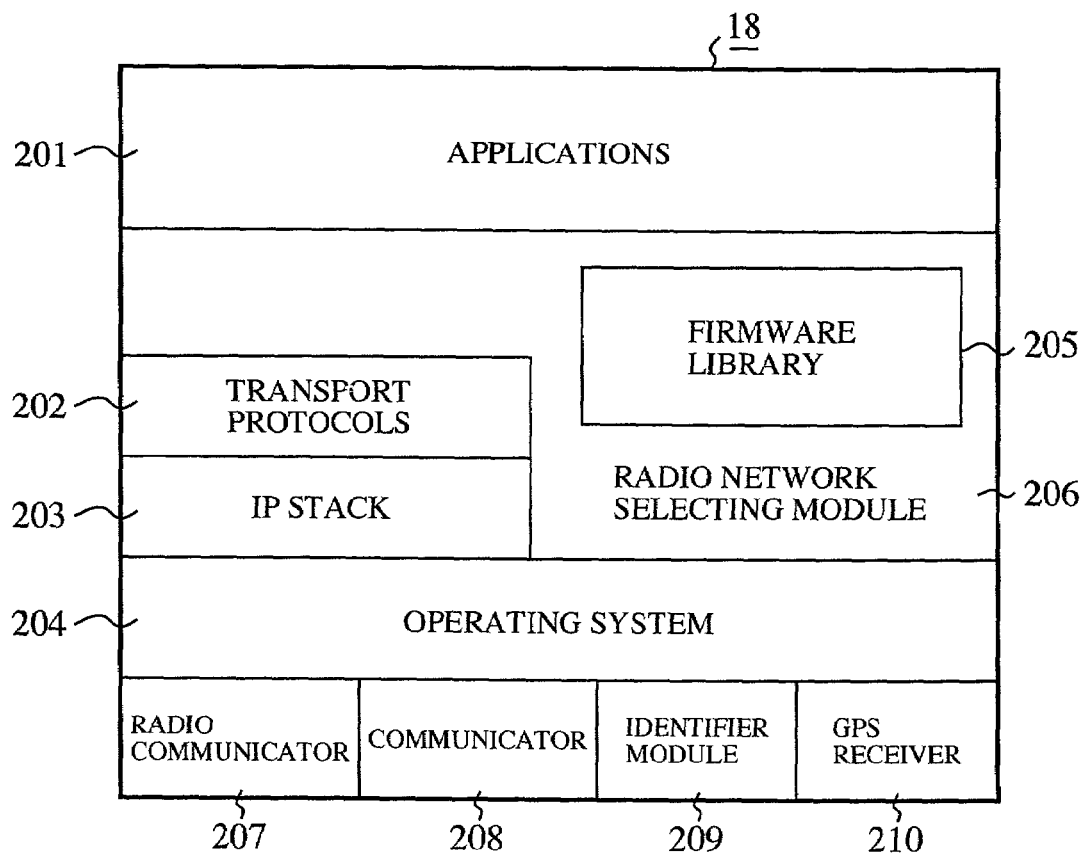
FIG. 4 is a conceptual diagram showing functional elements of a radio communication terminal in the radio communication system.

FIG. 4 is a conceptual diagram showing functional elements of a radio communication terminal, e.g., the radio communication terminal 18 in FIG. 2, which can implement roaming within the radio overlay network. In FIG. 4, 201 denotes applications, including a web browser, used in the radio communication terminal 18. The applications 201 include not only applications utilizing IP, but also applications that do not use IP. 202 denotes a transport protocols whose layer is upper than IP layer. 203 denotes an IP stack. 204 denotes an operating system for synthetically operating functional modules of the radio communication terminal 18. 205 designates a firmware library for a radio communicator 207. 206 denotes a radio network selecting module (selector and setter) for managing communication properties of the applications 201 and selecting a suitable radio communication sub-network in accordance with communication requirements of the applications 201. 207 denotes a radio communicator (negotiator) that can be reconstituted by software. The radio communicator 207 has a composite radio communication module and a composite antenna and operates on the basis of firmware downloaded from the firmware library 205.

208 denotes a communicator (location information transmitter) for communicating with the signaling radio communication network 19. Without downloading firmware, the communicator 208 operates to always receive signaling signals (paging signals) from the signaling radio communication network 19.

209 designates an identifier module used for identifying the radio communication terminal 18 itself and its owner. The identifier module 209 stores the IP address and authentication information of the radio communication terminal 18.

210 denotes a GPS receiver for obtaining information on the precise location of the radio communication terminal 18 itself. The GPS receiver 210 is used for inquiring about candidates of radio communication networks available for the radio communication terminal 18.

Figure 5:
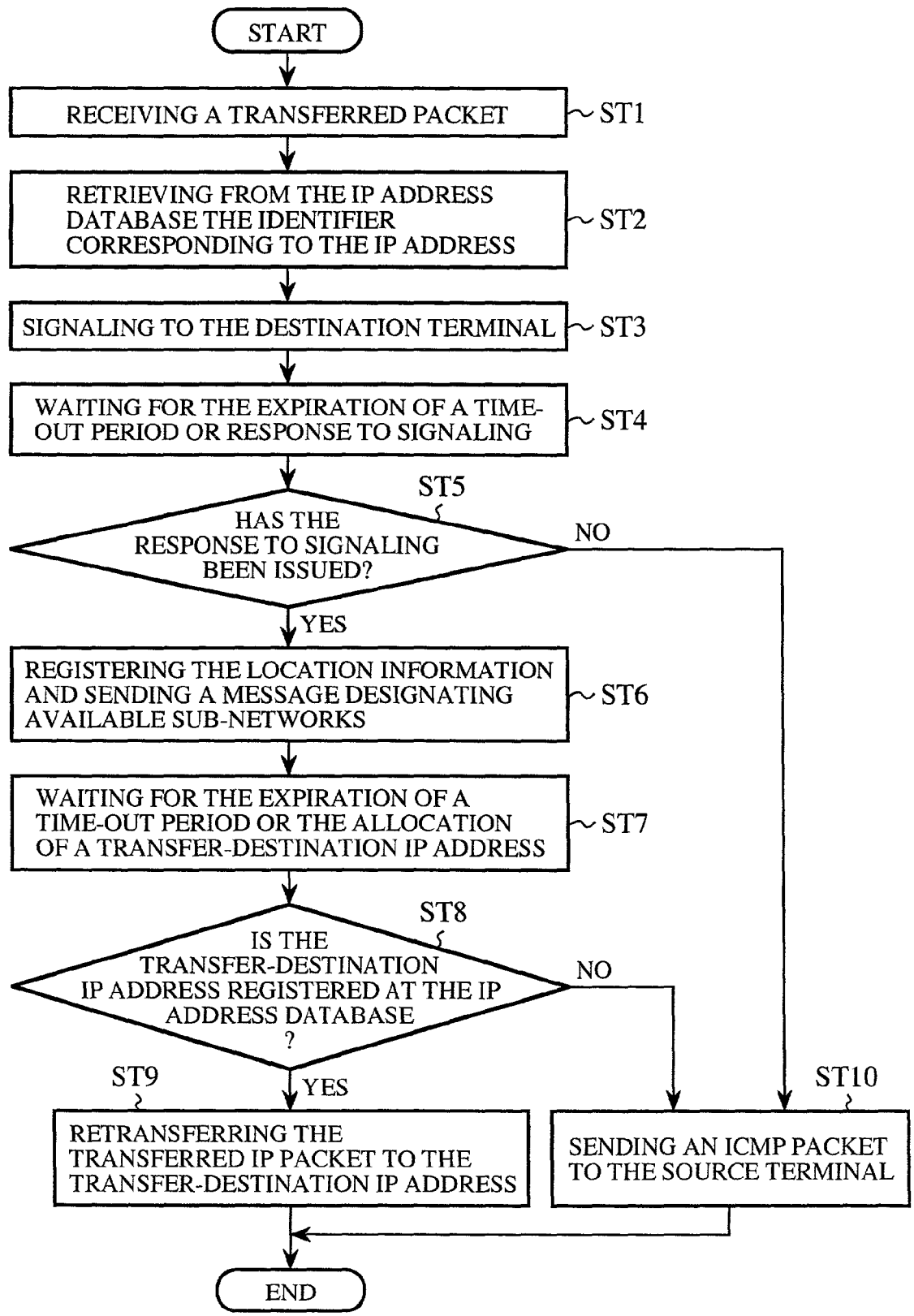
FIG. 5 is a flow chart showing a logical operation implemented by a signaling agent of the control station in the radio communication system.
Figure 6:
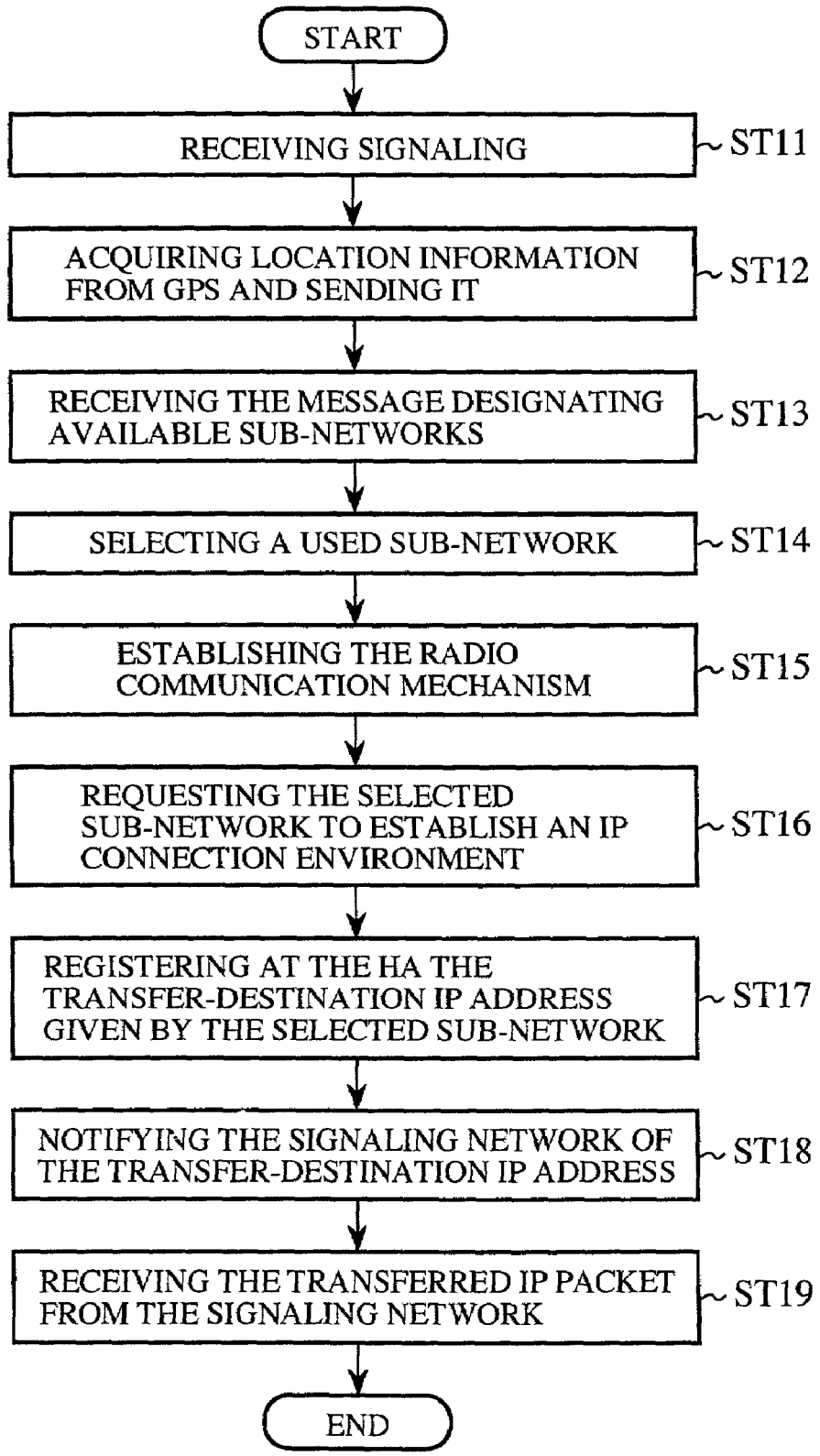
FIG. 6 is a flow chart showing an IP connection environment establishment logical operation implemented by a radio network selecting module of the radio communication terminal in the radio communication system.

FIG. 5 is a flow chart showing a logical operation implemented by the SA 101. FIG. 6 is a flow chart showing an IP connection environment establishment logical operation implemented by the radio network selecting module 206 of the radio communication terminal 18.

Next, operations will be described.

An IP packet transmitted from the fixed terminal 11 linked with the Internet 13 and destined for the radio communication terminal 18 is first delivered to the home network where the inherent IP address of the destination terminal 18 is permanently registered. The home network is a radio communication network to which a radio communication terminal subscribes. For example, the home network for the radio communication terminal 18 is the network 19.

The HA 12 on the home network captures the IP packet destined for the destination terminal 18. When the radio communication terminal 18 exists effectively in the home network, the IP packet is directly transferred from the HA 12 to the destination terminal 18. On the contrary, when the radio communication terminal 18 is apart from the home network and not served by any sub-networks of the radio overlay network, the HA 12 transfers the IP packets to the SA 14 (SA 101 in FIG. 3). As mentioned above, when the terminal 18 leaves from the home network, it registers at the HA 12 the IP address of the SA 101 as the transfer-destination IP address of the terminal 18 itself.

Once the SA 101 receives the transferred IP packet from the Internet 13 via the communication interface 106 at step ST1, the SA 101 refers to the inherent IP address of the radio communication terminal 18 included in the transferred IP packet, and retrieves from the IP address database 103, at step ST2, the identifier of the radio communication terminal 18 that is effective in the signaling network 19.

Then, the SA 101 utilizes the signaling control module 102 to execute paging or signaling to the radio communication terminal 18 using the identifier at step ST3, and awaits for a certain period at step ST4 a response from the terminal 18 replying to the signaling.

Upon receiving the signaling at the communicator 208 of the terminal 18 at step ST11 in FIG. 6, the terminal 18 acquires the current information on the location thereof from GPS using the GPS receiver 210.

Then, the operating system 204 of the radio communication terminal 18 controls the communicator 208 to send the SA 101 the inherent IP address and the location information of the radio communication terminal 18 at step ST12. If necessary, at the same time, the operating system 204 causes the communicator 208 to send the authentication information of the terminal 108 retrieved from the identifier module 209.

The SA 101 determines at step ST5 in FIG. 5, whether or not the response to the signaling has been issued from the radio communication terminal 18. Namely, it determines whether or not the location information or other information have been sent from the terminal 18.

If no response to the signaling is issued, the SA 101 returns the fixed terminal 11, which is the source of the IP packet, an ICMP (internet control message protocol) packet indicating that the subject transferred IP packet cannot reach the destination at step ST10.

If there has been the response to the signaling from the radio communication terminal 18, so that the SA 101 has received the location information from the radio communication terminal 18, the SA 101 registers the location information as the latest location information of the radio communication terminal 18 in the IP address database 103, and retrieves, on the basis of the location information, from the location information database 105 candidates of radio communication networks, which are available for the radio communication terminal 18.

If the SA 101 has received the authentication information from the radio communication terminal 18, the SA 101 may conduct an authentication to verify the subscribership of the radio communication terminal 18 on the basis of the authentication information. For example, the SA 14 may inquire of the HA 12 about the authentication information and may compare the authentication information from the HA 12 with the authentication information of the radio communication terminal received from the radio communication terminal 18. Alternatively, it is possible to register at the IP address database 103 or another suitable database the relationship between the inherent IP addresses and the authentication information of all radio communication terminals served by the radio overlay network, and to read out the registered authentication information for the authentication process of a subject terminal.

The latest location information on the terminal 18 registered at the IP address database 103 will be referred by the signaling control module 102 for the issuance of signaling at step ST3 in the future. The signaling control module 102 causes the base station controlling module 104 to select the base station that is suitable for the latest location of the radio communication terminal 18 and utilizes the base station to issue signaling to the radio communication terminal 18.

Figures 7, 8:
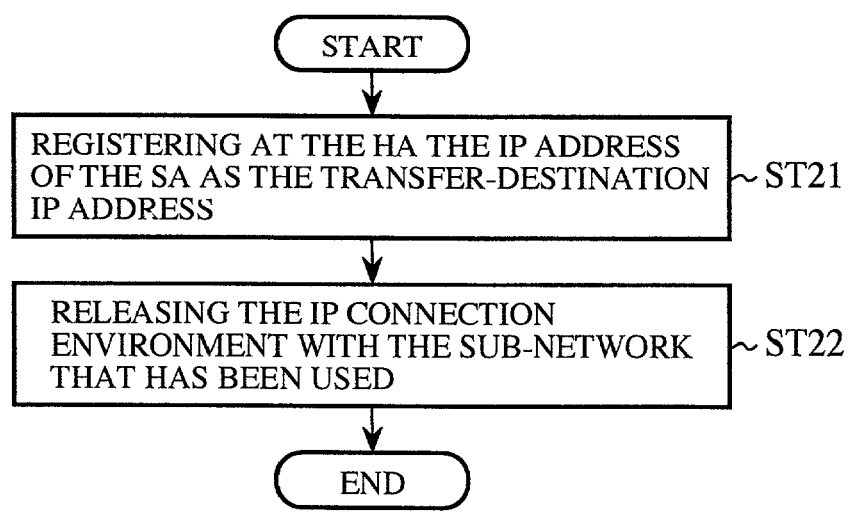
FIG. 7 is a table showing a format of records stored in a location information database in the radio communication system.
FIG. 8 is a flow chart showing a logical operation for terminating IP communication in the radio communication system.

FIG. 7 shows a format of records stored in the location information database 105. In FIG. 7, 301 depicts a base station name field. 302 designates a longitude field. 303 designates a latitude field. 304 designates an operational status field. 305 and 306 designate records corresponding to individual base stations, respectively. A record for supervising a base station of a radio sub-network is constituted of a base station name field 301 indicating the name of the base station, a longitude field 302 indicating the easternmost and westernmost edges of the cell of which the base station is in charge, a latitude field 303 indicating the northernmost and southernmost edges of the cell, and a operational status field 304 indicating the operational status of the base station.

For example, when there is the radio communication terminal 18 at the point where latitude 35°20'20.5" N meets longitude 139°10'11.5" E, the records 305 and 306 correspond to the base stations that are available for the radio communication terminal 18.

When the decision at step ST5 is affirmative, the SA 101 transmits at step ST6 the radio communication terminal 18 a message that includes a list designating candidates of radio communication networks available for the destination terminal 18. The message also includes the header of the IP packet to be transferred in its original form (the header of the inherent IP packet received from the Internet 13). However, if the authentication of the radio communication terminal 18 is failed, the SA 101 transmits the fixed terminal 11 an ICMP packet indicating that the IP packet cannot reach the destination at step ST10.

Next, at step ST7, the SA 101 waits until a transfer-destination IP address (new temporary IP address) of the terminal 18, which is effective in the available radio communication network, is allotted to the terminal 18. The completion of the allotment of the transfer-destination IP address to the radio communication terminal 18 means the establishment of an IP connection environment between the available radio communication network and the radio communication terminal 18.

The radio communication terminal 18 receives the message including the list of the available radio communication networks and the header of the IP packet in its original form transmitted at step ST6. Upon receiving it at step ST13 in FIG. 6, the radio network selecting module 206 selects the sub-network to be used at step ST14, taking account of the recommended attributes of quality of service designated by the packet header, requirements for related applications, and the traveling status of the radio communication terminal 18.

Next, the radio network selecting module 206 of the radio communication terminal 18 selects firmware stored in the firmware library 205 in order to enable the terminal 18 to communicate with the selected radio communication network and download it into the radio communicator 207 to establish the mechanism for radio communication at step ST15.

Once the radio communication mechanism becomes at the ready for communication, the radio communicator 207 execute signaling to the selected radio communication network to establish the IP connection environment at step ST16. For example, if the selected network is the radio communication network 20 for mobile phones, the radio communicator 207 negotiates with the network 20 for setting up the connection environment between the selected network 20 and the radio communication terminal 18. More specifically, radio communicator 207 requests the exchange-control center of the radio communication network 20 to establish a radio link and to allocate an IP address to the terminal 18. In response to the request, the exchange-control center sets up a radio link between a suitable base station and the radio communication terminal 18 and allocates an IP address, which is effective in the radio communication network 20, to the radio communication terminal 18.

If the selected network is the radio communication network 21, the radio communicator 207 requests the DHCP (dynamic host configuration protocol) server on a base station of the network 21 to allocate an IP address to the terminal 18. In response, the DHCP server allocates an IP address, which is effective in the radio communication network 21, to the terminal 18.

Once the IP connection environment has been established by the selected radio communication network as mentioned above, the radio communication terminal 18 registers the newly obtained temporary IP address as the transfer-destination IP address at the HA 12 of the home network at step ST17. Accordingly, afterward, IP packets destined for terminal 18 and received by the HA 12 can be transferred from the HA 12 to the radio communication terminal 18 without passing through the SA 14 (SA101).

Furthermore, the terminal 18 sends an IP packet to the SA 101 in the signaling network 19 for notifying the SA 101 of the inherent IP address and the newly obtained temporary transfer-destination IP address of the radio communication terminal 18 at step ST18.

Upon receiving from the terminal 18 the notification of the transfer-destination IP address assigned to the terminal 18, the SA 101 of the control station 15 registers the transfer-destination IP address at the IP address database 103 in the same station 15. In addition, the SA 101 determines at step ST8 in FIG. 5 whether or not the transfer-destination IP address is registered at the IP address database 103.

If the transfer-destination IP address is not registered for a certain period, the SA 101 sends the fixed terminal 11, which is the source, an ICMP packet indicating that the packet cannot reach the destination at step ST10 since the failure of register means the failure of establishment of the IP connection environment.

On the contrary, when the SA 101 has received the notification of the transfer-destination IP address and has registered the transfer-destination IP address at the IP address database 103, the decision at step ST8 is affirmative. In this case, the SA 101 modifies the IP packet transferred from the HA 12 for the terminal 18 into a form adapted to the selected radio communication network, and transfers the modified IP packet via the Internet 13 to the transfer-destination IP address under the selected network, using the communication interface 106 at step ST9.

Consequently, at step ST19, the radio communication terminal 18 receives the IP packet that has been once transferred to the SA 14 and modified by the SA 14.

Thereafter, it is not necessary for the HA 12 to transfer IP packets from the fixed terminal 11 to the SA 14 (SA 101) as described above. Consequently, IP packets are transferred from the HA 12 for the radio communication terminal 18 to the selected radio communication network, indicating the transfer-destination IP address (new temporary IP address) given by the selected network. Therefore, the radio communication terminal can receive the IP packets.

On the other hand, IP packets from the radio communication terminal 18 destined for the fixed terminal 11 are delivered to the terminal 11 via the selected radio communication network and the Internet 13. Of course, the IP address of the fixed terminal 11 is not varied.

When the IP communication is terminated by the intention of the owner of the radio communication terminal 18, a logical operation shown in FIG. 8 will be executed.

First, at step ST21, the radio communication terminal 18 registers the IP address of the SA 101 of the signaling network 19 at the HA 12 for the terminal 18 itself. Thereafter, when any terminal on the Internet 13 transmits an IP packet destined for the inherent IP address of the radio communication terminal 18 again, the IP packet will be transferred to the SA 101 and then, another IP connection environment will be established as similar to the above-described manner.

Next, at step ST22, the radio communication terminal 18 releases the IP connection environment with the radio communication network that has been used. For example, when the radio communication network 20 has been employed, the radio communication terminal 18 disconnects the radio link, whereby the transfer-destination IP address allotted to the radio communication terminal 18 in the network 20 is automatically released.

When the radio communication network 21 has been utilized, the radio communication terminal 18 stops to send out DHCP renewal messages. Consequently, the transfer-destination IP address allotted to the radio communication terminal 18 in the network 21 will be released by the time-out of DHCP renewal message.

It is possible that the IP communication for the radio communication terminal 18 ceases unintentionally after the completion of establishment of the connection environment between the radio communication terminal 18 and the sub-network selected by the radio communication terminal 18. In such a case, the transfer-destination IP address assigned to the radio communication terminal 18 in the new sub-network may be released. This may result in that the same IP address will be used as a transfer-destination IP address of another radio communication terminal, causing confusion in routing.

For preventing such a problem, if the IP communication for the radio communication terminal 18 has ceased unintentionally, the HA 12 provides the SA 101 with information indicating that the disconnection has happened. Upon detecting the information, the SA 101 immediately pages the radio communication terminal 18 on the basis of the latest location information that has been already registered. Then, the SA 101 receives authentication information from the terminal 18 and executes the authentication of the terminal 18 on the basis of the authentication information. In this case, it is not necessary to obtain the location information or to select an appropriate available network. When the authentication is successfully achieved, the SA 101 immediately reads the transfer-destination IP address from the IP address database 103 of the control station 15 and sends the transfer-destination IP address from the communication interface 106 to the HA 12 via the Internet 13. Namely, the SA 101 informs the HA 12 of the transfer-destination IP address assigned to the communication terminal directly before the interruption of communication. The HA 12 overwrites the transfer-destination IP address of the radio communication terminal 18 in the HA 12 itself, so as to replace the previous one with the transfer-destination IP address newly provided by the SA 101. Consequently, the HA 12 returns the registered transfer-destination IP address to that registered at step ST17. In accordance with such an easy procedure, the IP communication with the radio communication terminal 18 can be restarted using the transfer-destination IP address, which is the same as that used before the interruption of communication.

As will be understood from the above description, in accordance with the first embodiment, a radio communication terminal, such as a mobile phone handset, can execute IP communication via a composite radio communication network since one of the sub-network constituting the composite radio communication network pages the radio communication terminal, receives information on the location of the radio communication terminal, and retrieves candidate sub-networks available for the radio communication terminal on the basis of the location information.

In accordance with the first embodiment, when the header of the IP packet transferred from the HA 12 indicates recommended attributes of quality of service, the SA 101 sends the radio communication terminal 18 the message including the header of the IP packet in its original form at step ST6. Accordingly, with reference to the attributes of recommended quality of service indicated in the received message, the radio communication terminal 18 can select a radio network that can realize appropriate attributes of quality of service.

It should be noted in connection with the first embodiment, if there is the HA for the radio communication terminal in the sub-network that the radio communication terminal selects, the inherent IP address of the radio communication terminal may be used in the selected sub-network since the radio communication terminal exists effectively under the home sub-network, to which the mobile terminal subscribes. In this case, since it is not necessary to transfer the IP packet to the SA or another sub-network, the radio communication terminal disenables the HA to transfer IP packets.

Second Embodiment

In a second embodiment of the radio overlay network, when change of sub-network used by the radio communication terminal 18 becomes necessary, the radio network selecting module 206 of the radio communication terminal 18 may inquire of the SA 101 about the sub-networks that can be availed by the radio communication terminal 18. The reason for change of sub-network is, for example, a change of communication requirements indicated by the application used in the radio communication terminal 18, a change of quality of service indicated by the other party (source terminal), or movement of the radio communication terminal 18.

In the radio communication terminal 18, once the operating system 204 detects a change in communication requirement indicated by the utilized application, it inquires of the SA 101 about available sub-networks. In addition, once the operating system 204 detects that recommended attributes of quality of service indicated by a received IP packet differ from the attributes of quality of service that has been applied, it inquires of the SA 101 about available sub-networks.

The reasons for change of sub-network include an interruption of communication with the availed radio network by movement of the radio communication terminal 18. In such a case, the radio communication terminal 18 may inquire of the SA 101 in the signaling network 19 about available sub-networks. Additionally, if necessary, the radio communication terminal 18 sends the location information to the SA 101 as similar to step ST12 of FIG. 6 for facilitating decision of candidate sub-networks for the traveling terminal.

Figure 9:
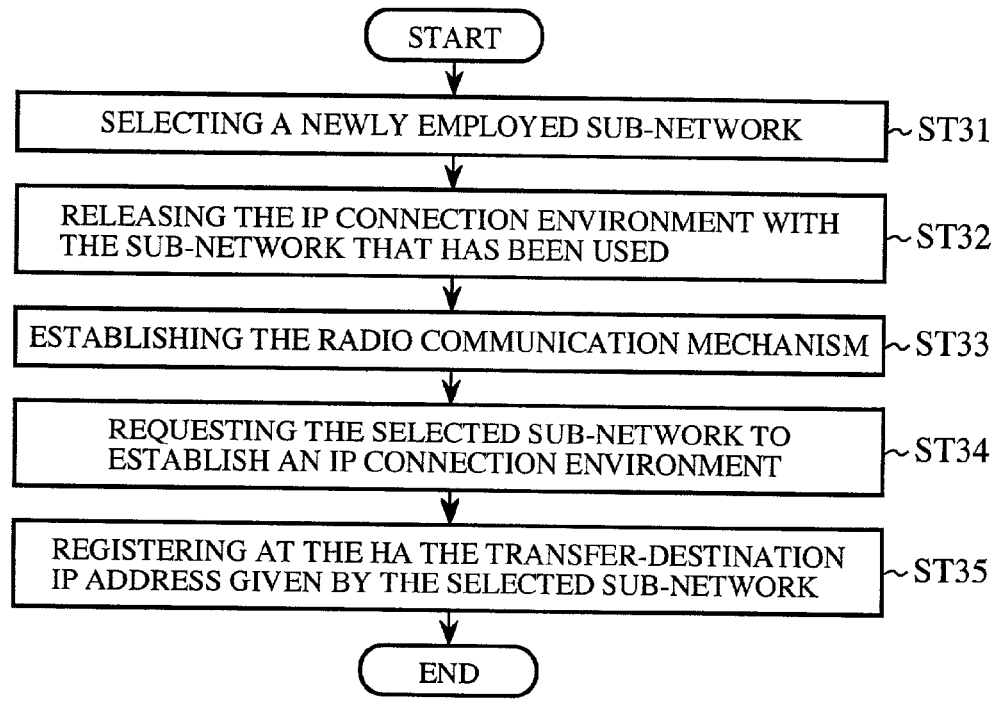
FIG. 9 is a flow chart showing a method for replacing radio communication network according to a second embodiment of the present invention.

With reference to the flow chart in FIG. 9, a method for replacement of sub-network in accordance with the second embodiment will be described.

First, on the basis of the information on candidate sub-networks received from the SA 101, the radio network selecting module 206 selects a newly employed radio communication network at step ST31.

At step ST32, the radio communication terminal 18 releases the IP connection environment as similar to step ST22 of FIG. 8. Furthermore, at step ST33, the radio communication terminal 18 sets up the radio communication mechanism for accommodating itself to the newly selected radio communication network as similar to step ST15 of FIG. 6. However, if the communication with the radio network has already been impossible, step ST32 is omitted.

Next, as similar to step ST16 and step ST17 of FIG. 6, the radio communication terminal 18 requests the selected radio communication network to establish an IP connection environment at step ST34 and registers at the HA 12 at step ST35 a transfer-destination IP address newly obtained by step ST34, thereby completing the replacement of the radio communication network.

Third Embodiment

In the first and second embodiments, the individual sub-networks 19, 20 and 21 constituting the radio overlay network are used for IP communication. However, each of the individual sub-networks has an inherent purpose, e.g., mobile phone network, PHS network, or bidirectional pager network. Moreover, individual radio communication terminals under the radio overlay network include not only terminals specialized for IP communication, but also terminals that can execute inherent purpose and IP communication, such as mobile phone or PHS handsets.

Some packets are frequently used only in a specific sub-network. For example, packets for mobile phone can be used in mobile phone handsets. It is preferable that discrimination can be made on whether or not a packet is useful in a specific sub-network.

Accordingly, when an IP packet transferred from the HA 12 is useful in a specific network and includes a designation of sub-network that the destination terminal can avail, the SA 101 may send the designation information. A third embodiment of the present invention, which will be described below, provides a signaling mechanism for facilitating the use of inherent function effective in a specified sub-network of the radio overlay network.

As to the following description, it is assumed that the radio communication terminal 18 is a destination and is a mobile phone handset that can be served by the mobile phone network 20. If a source terminal served by the network 20 transmits a packet destined for the terminal 18, the network 20 generates another IP packet destined for the SA 101 and indicating the inherent IP address of the terminal 18 and network authentication information of the network 20. Then, the network 20 transmits the IP packet to the SA 101 of the signaling radio communication network 19.

Figure 10:
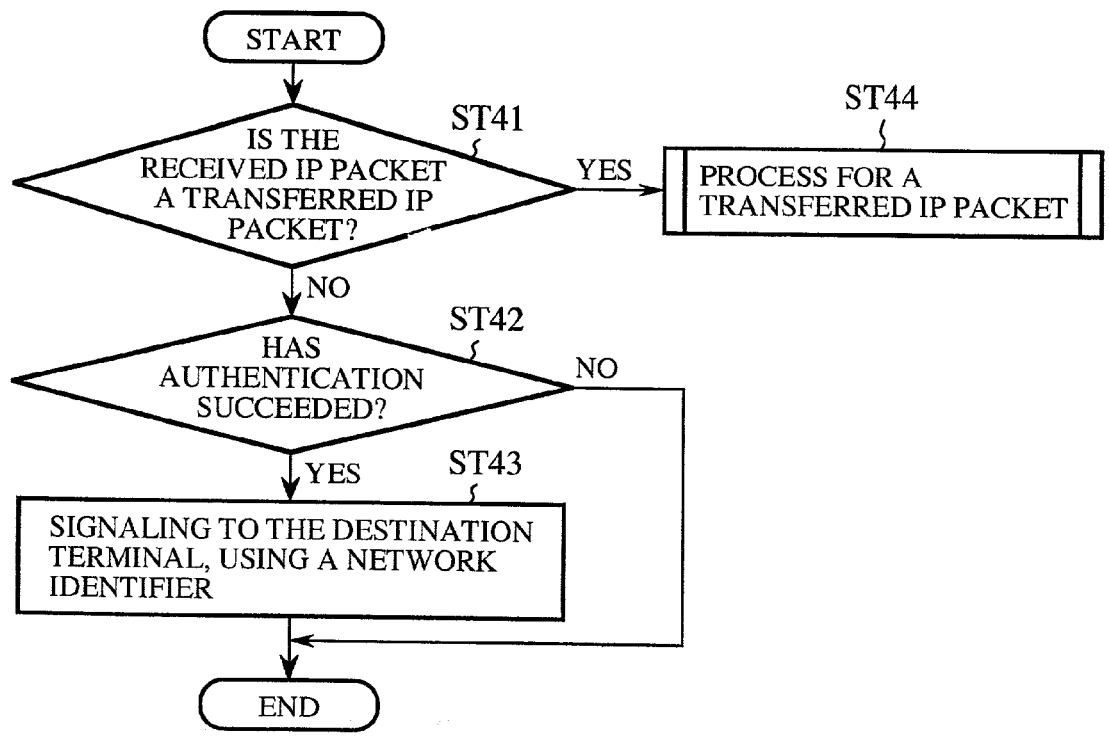
FIG. 10 is a flow chart showing a process executed by a signaling agent according to a third embodiment of the present invention.

In the third embodiment, the SA 101 executes an operation according to the flow chart in FIG. 10 once it has received an IP packet.

First, the SA 101 determines at step ST41 whether or not the received IP packet is a transferred IP packet to be transferred to a terminal. If the determination is negative, the received IP packet is the above-mentioned packet destined for the SA 101 itself in order to inform the SA 101 which network should be used for the next coming packet. In this case, the SA 101 designates the number of processing port and proceeds with the signaling logical operation including steps ST42 and ST43.

On the contrary, if the received IP packet is a transferred IP packet, the operation proceeds to step ST44 at which the SA 101 executes a process for a transferred IP packet. This process is the same as the logical operation that has been described with reference to FIG. 5.

At step ST42, the SA 101 uses a network authentication function of the signaling control module 102 to conduct an authentication to verify the membership of the radio communication network 20 in the radio overlay network. That is, the SA 101 determines whether or not the source network is a proper member of the radio overlay network on the basis of the network authentication information contained in the IP packet. Furthermore, on the basis of the inherent IP address of the radio communication terminal 18 extracted from the IP packet, the SA 101 retrieves from the IP address database 103 the identifier of the radio communication terminal 18 effective in the signaling network 19.

If the authentication has succeeded, SA 101 generates a signaling message to which added is a network identifier indicating the network 20 that is the source of signaling, and execute signaling to the radio communication terminal 18, using the signaling message at step ST43.

Figure 11:
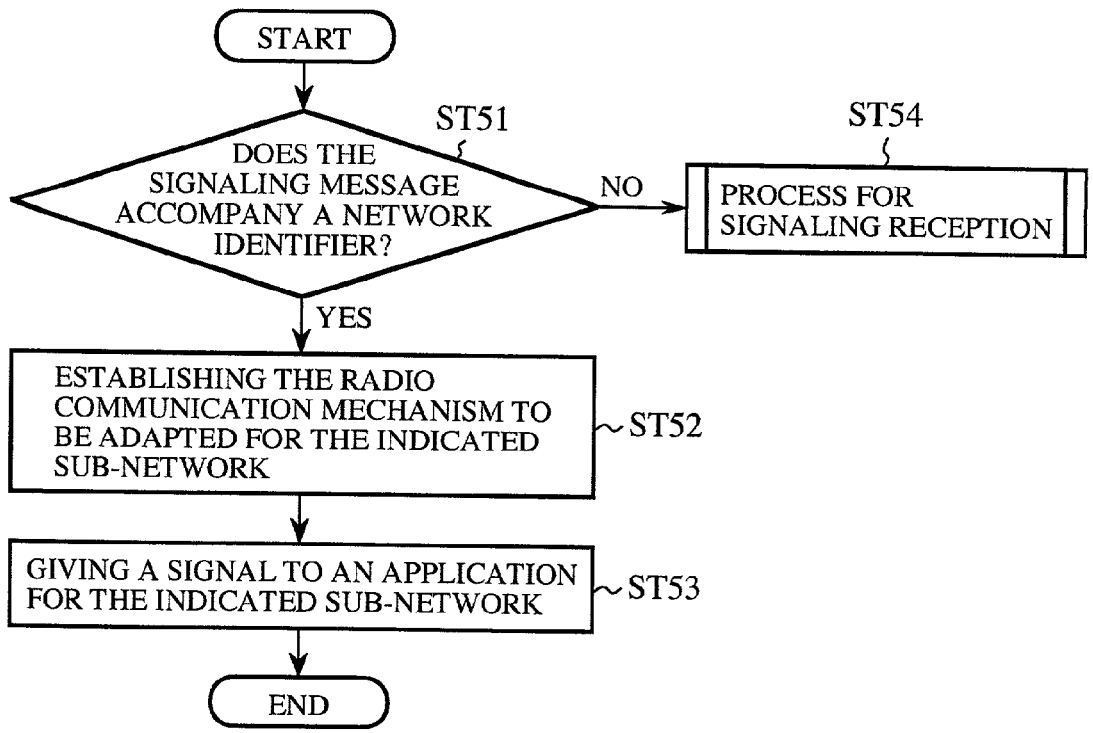
FIG. 11 is a flow chart showing a process executed by a radio communication terminal according to a third embodiment of the present invention.

In the third embodiment, upon receiving the signaling message, the radio communication terminal 18 executes a logical operation shown in the flow chart of FIG. 11. First, the radio communication terminal 18 determines whether or not the received signaling message accompanies the network identifier at step ST51. If the determination is negative, the operation proceeds to step ST54 at which the radio communication terminal 18 executes a process for signaling reception. This process is the same as the IP connection environment establishment logical operation that has been described with reference to FIG. 6.

On the other hand, the signaling message accompanies a network identifier, the radio communication terminal 18 selects firmware stored in the firmware library 205 in order to enable the terminal 18 to communicate with the radio communication network 20 indicated by the network identifier and downloads it into the radio communicator 207 to establish the mechanism for radio communication at step ST52. Then, the radio communication terminal 18 gives a signal to an application for the indicated network 20, to execute it at step ST53. This application is adapted for mobile phone. Next, the application replies to the signaling, so as to utilize the radio communication terminal 18 as a mobile phone handset.

Fourth Embodiment

Although the respective sub-networks 19, 20, and 21 forming the radio overlay network inherently include IP management modules in the foregoing embodiments, it is possible to incorporate into the radio overlay network a radio communication network that does not have an IP management module inherently.

In a fourth embodiment of the present invention, if the radio communication network selected by the radio communication terminal 18 does not inherently comprise the IP management module (for example, IP address allocation module), the SA 101 functions as the IP management module for the selected network and allocates a temporary IP address to the terminal 18.

Let us assume that the network 20 is a mobile phone network that does not inherently comprise the IP management module.

The control station 15 where the SA 101 is provided comprises a special trunk for connecting with the radio communication network 20. The IP address database 103 of the control station 15 stores extra IP addresses that are not employed by the IP sub-network 19 to which the control station 15 is connected.

If the destination radio communication terminal 18 selects the network 20, the SA 101 selects an IP address from among the extra IP addresses stored in the IP address database 103 and temporarily allocates it to the destination terminal 18. Then, the SA 101 stores the temporary IP address in such a manner that it is related to the inherent IP address of the radio communication terminal 18 and the identifier of the terminal 18 effective in the signaling network 19.

Figure 12:
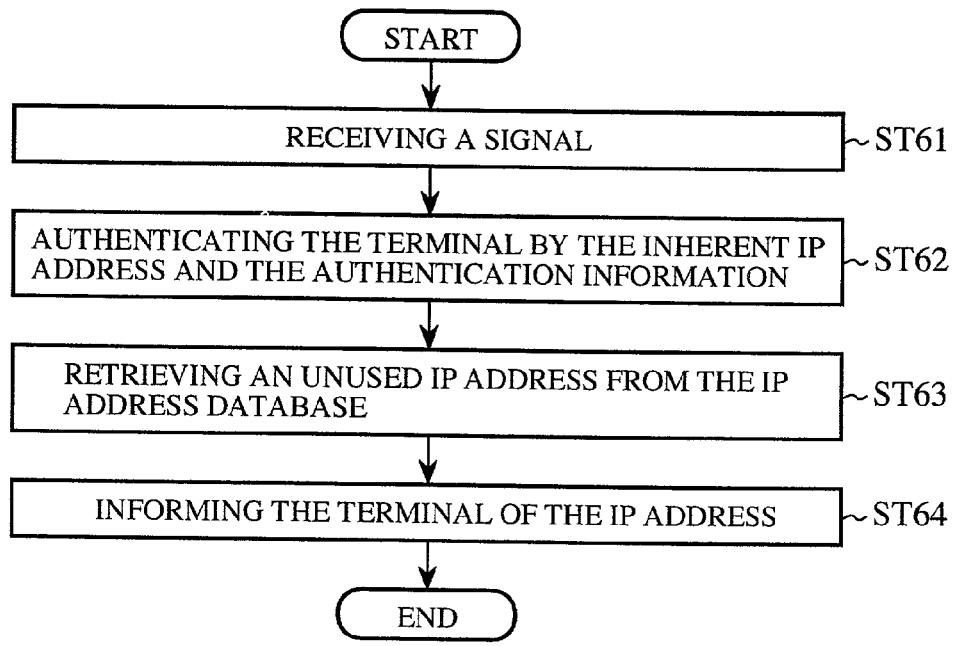
FIG. 12 is a flow chart showing an IP connection environment establishment process according to a fourth embodiment of the present invention.

If the radio communication terminal 18 selects the network 20, the radio communication terminal 18 pages the control station, using the network 20, so as to interconnect the control station 15 and the network 20. After the interconnection, the control station 15 executes an IP connection environment establishment process shown in the flow chart of FIG. 12.

Upon receiving a signal from the radio communication terminal 18 at step ST61, the signal indicating that the connection has been established, the control station 15 carries out an authentication of the radio communication terminal 18 at step ST62, comparing the inherent IP address and the authentication information of the terminal 18 transmitted from the terminal 18 with those stored in the IP address database 103.

Next, the control station 15 retrieves an unused IP address from the IP address database 103 at step ST63, and informs the terminal 18 of the IP address at step ST64.

By means of the above-described process, an IP address is temporarily assigned to the radio communication terminal 18, so that an IP connection environment adapted for the radio communication terminal 18 may be deployed. The process of the fourth embodiment can be realized by suitably modifying the above-described first through third embodiments.

Fifth Embodiment

Furthermore, the destination terminal 18 may separately select a network for a rearward (upstream) link for transmission from the terminal 18 and another network for a forward (downstream) link for reception by the terminal 18. In this case, respective connection environments for rearward and forward links may be deployed.

A fifth embodiment of the present invention provides means for establishing a transmission IP route and a reception IP route for the radio communication terminal 18 including a plurality of radio communication mechanisms that are workable simultaneously.

The radio network selecting module 206 of the radio communication terminal 18 selects radio networks for transmission and reception, respectively, and establishes its IP connection environment with respect to the newly selected network for reception in the manner that has been described above. In addition, the module 206 establishes its IP connection environment with respect to the newly selected network for transmission. After the establishments of both connection environments, the radio communication terminal 18 may use the rearward link for only transmission and the forward link for only reception. However, the establishment of the IP transmission environment is the same as that of the IP reception environment fundamentally.

The fifth embodiment may be effective especially for a radio communication network such as a kind of satellite communication of which only downlink routes can be utilized by users. In such a case, this network can be used for the downstream route while another network can be used for the upstream route.

While the present invention has been particularly shown and described with references to preferred embodiments thereof, it will be understood by those skilled in the art that various changes in form and details may be made therein without departing from the spirit and scope of the invention as defined by the claims. Such variations, alterations, and modifications are intended to be encompassed in the scope of the claims.

What is claimed is:

1. A radio communication control station, for communicating with a radio communication terminal that roams among sub-networks, comprising:
    a packet receiver for receiving an IP packet destined for a radio communication terminal subscribing to one of sub-networks constituting a composite radio communication network;
    a paging controller for causing one of the sub-networks to page the radio communication terminal;
    a location information receiver for receiving location information on a current location of the radio communication terminal from the radio communication terminal;
    a retriever for retrieving candidates of sub-networks that is employed by the radio communication terminal on the basis of the location information on the radio communication; and
    a packet transmitter for modifying the IP packet, which has been already received by the packet receiver, to be matched with the selected sub-network when an connection environment is established between the sub-network selected by the roaming radio communication terminal for its use and the radio communication terminal, the packet transmitter transmitting the modified IP packet to the radio communication terminal.

2. A radio communication control station according to claim 1, wherein the paging controller causes a sub-network having a maximum service area among the sub-networks to page the radio communication terminal.

3. A radio communication control station according to claim 1, wherein the paging controller transmits information on the candidates of sub-networks, which is employed by the radio communication terminal, to the radio communication terminal.

4. A radio communication control station according to claim 1, further comprising an authenticator for verifying authentication information of the radio communication terminal received from the radio communication terminal.

5. A radio communication control station according to claim 4, further comprising a transmitter for transmitting information to a home network to which the radio communication terminal originally subscribes, the authenticator executing an authentication for the radio communication when the radio communication control station detects that communication between the sub-network and the radio communication terminal has ceased after an connection environment has been established between the sub-network selected by the radio communication terminal for its use and the radio communication terminal, the transmitter informing the home network of a transfer-destination address of the radio communication terminal assigned before the communication has ceased when the radio communication control station detects that the communication has ceased.

6. A radio communication control station according to claim 1, further comprising a location information database storing location information on all base stations belonging to the composite radio communication network, the retriever retrieving from the location information database the candidates of sub-networks that is employed by the radio communication terminal on the basis of the location information on the radio communication terminal.

7. A radio communication control station according to claim 1, further comprising a storage at which the location information received from the radio communication terminal is registered as a latest location information of the radio communication terminal, the paging controller selecting at least one base station, which is suitable for the latest location information of the radio communication terminal registered at the storage, from among the sub-network used for paging and causing the selected base station to page the radio communication terminal.

8. A radio communication control station according to claim 3, wherein the paging controller transmits a message designating attributes of quality of service to the radio communication terminal when the attributes of quality of service are designated in the IP packet received by the packet receiver.

9. A radio communication control station according to claim 3, wherein the paging controller transmits information on a sub-network that should be employed to the radio communication terminal when the IP packet received by the packet receiver is effectual only in the specific sub-network.

10. A radio communication control station, for communicating with a radio communication terminal that roams among sub-networks, comprising:
    a packet receiver for receiving an IP packet destined for a radio communication terminal subscribing to one of sub-networks constituting a composite radio communication network;
    a paging controller for causing one of the sub-networks to page the radio communication terminal;

a location information receiver for receiving location information on a current location of the radio communication terminal from the radio communication terminal;

a retriever for retrieving candidates of sub-networks that is employed by the radio communication terminal on the basis of the location information on the radio communication terminal; and an IP management module for allocating a temporary IP address to the radio communication terminal when the roaming radio communication terminal selects a sub-network that does not comprises an IP address allocating mechanism for allocating IP addresses to terminals.

11. A radio communication terminal that roams among sub-networks, comprising:

a location information transmitter for acquiring location information on a current location of the radio communication terminal and transmitting the location information to a radio communication control station when the radio communication terminal has been paged by the radio communication control station in one of sub-networks constituting a composite radio communication network;

a selector for selecting a sub-network, which the radio communication terminal utilizes, from candidates of sub-networks available for the radio communication terminal once receiving information on the candidates of sub-networks;

a setter for setting up a communication mechanism to be matched with the selected sub-network; and a negotiator for negotiating with the selected sub-network for establishing an environment of communication between the selected sub-network and the roaming radio communication terminal;

wherein the location information transmitter acquires the location information of the radio communication terminal and transmits the location information to the radio communication control station when change of sub-network used by the radio communication terminal becomes necessary, the selector obtaining information on candidates of sub-networks available for the radio communication terminal and selecting a sub-network, which the radio communication terminal utilizes, from the candidates of sub-networks, the setter resetting up the communication mechanism to be matched with the selected sub-network; and wherein the location information transmitter acquires the location information of the radio communication terminal and transmits the location information to the radio communication control station when the radio communication terminal receives an IP packet requiring attributes of quality of service that are different from the attributes of quality of service currently used, the selector obtaining information on candidates of sub-networks available for the radio communication terminal and selecting a sub-network, which the radio communication terminal utilizes, from the candidates of sub-networks, the setter resetting up the communication mechanism to be matched with the selected sub-network.

12. A radio communication terminal according to claim 11, wherein the selector separately selects a sub-network for transmission by the terminal and a sub-network for reception by the terminal, the negotiator negotiates with both of the selected sub-networks for establishing environments for communication between respective sub-networks and the terminal.

13. A home agent provided in a sub-network of a composite radio communication network, and supervising, receiving, and transferring IP packets destined for radio communication terminals subscribing to the sub-network, the home agent comprising a transferer that transfers an IP packet to a destination terminal using an IP address inherent in the destination terminal without transferring the IP packet to another sub-network when the destination terminal exists effectively in the sub-network where the home agent is provided and the inherent IP address is used in the sub-network, the transferer transferring an IP packet to a radio communication control station provided in the composite radio communication network when the destination terminal does not effectively exist in any sub-networks constituting the composite radio communication network, the transferer using a temporary IP address to transfer IP packets received after the destination terminal obtains the temporary IP address that is effective in a visited sub-network different from the network at which the home agent is provided.

14. A home agent according to claim 13, wherein when communication between the visited sub-network and the radio communication terminal has ceased after the destination terminal obtains the temporary IP address effective in the visited sub-network, the home agent is notified of a temporary IP address of the radio communication terminal that was effective before the communication has ceased and registers the temporary IP address of the radio communication terminal at the home agent.

15. A radio communication method, for communicating with a radio communication terminal that roams among sub-networks, comprising:

receiving an IP packet destined for a radio communication terminal subscribing to one of sub-networks constituting a composite radio communication network;

causing one of the sub-networks to page the radio communication terminal;

receiving location information on a current location of the radio communication terminal from the radio communication terminal;

retrieving candidates of sub-networks that can be employed by the radio communication terminal on the basis of the location information on the radio communication terminal;

transmitting information on the candidates of sub-networks, which can be employed by the radio communication terminal, to the radio communication terminal; and sending the roaming radio communication terminal the IP packet, which has been received by the packet receiver, to be matched with the selected sub-network after an connection environment has been established between the sub-network selected by the radio communication terminal for its use and the radio communication terminal.

* * * * *